April 10, 1951  W. J. PATTERSON  2,548,812
CENTRIFUGAL EGG SEPARATOR
Filed Feb. 12, 1948
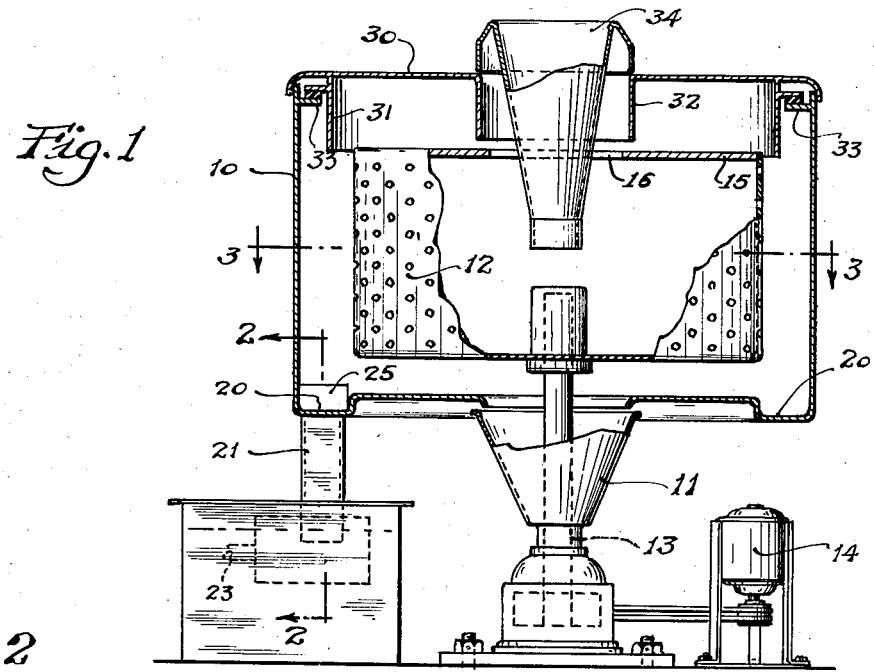
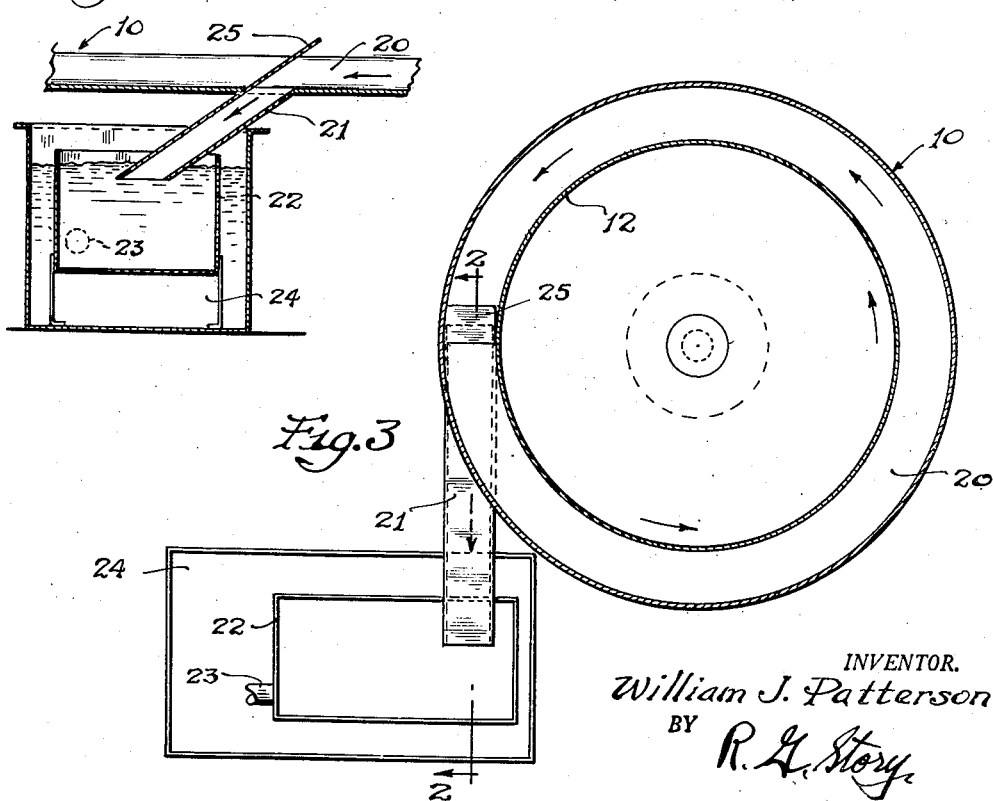
INVENTOR.
William J. Patterson
BY
R. G. Story
ATTORNEY Patented Apr. 10, 1951

2,548,812

UNITED STATES PATENT OFFICE 2,548,812

CENTRIFUGAL EGG SEPARATOR

William J. Patterson, La Grange, Ill., assignor to Swift & Company, Chicago, Ill., a corporation of Illinois Application February 12, 1948, Serial No. 7,850

7 Claims. (Cl. 146—2)

This invention relates to an egg separator and more particularly to means for centrifugally separating egg meats from their shells.

It is an object of this invention to provide an improved centrifugal means to quickly separate the meats from the egg shells.

Another object of this invention is to provide a centrifugal means that is operative to effect separation of egg meats from their shells without unduly beating the egg meats into a froth.

A further object of the invention is to provide an improved egg separator for handling bulk quantities of eggs.

Other objects will appear in the specification below.

The drawings show the preferred embodiment of the invention wherein:

Figure 1 represents a sectional side elevation of the machine;

Figure 2 is a view taken on line 2—2 of Figure 1; and

Figure 3 is a top plan view taken on line 3—3 of Figure 1.

Recently a process has been devised making it commercially expedient to break eggs in bulk quantities for separation of the egg meats from the shells. This process is based upon the principle of treating eggs so as to eliminate defective eggs and then handling the remaining eggs to stabilize the egg meats against bacterial action, sterilize the surface of the egg shells, and then centrifugally separate the liquid egg meats from the shell particles. When the surface of the egg shell has been rendered sterile and all possibility of bacterial action taking place in the egg meat minimized, the meats can be separated from the shells in a bulk centrifuging process to produce a separated product having an improved quality as compared with all known prior methods of separating egg meats from their shells.

This commercial practice requires that the egg meats be separated rapidly from the shells in bulk quantities, and the centrifugal separator seems ideal for this purpose. Attempts were made to separate egg meats rapidly with centrifugal machines such as are commercially available, but none was found which was operative for this purpose to successfully separate the egg meats from the shells in quantity lots and without unduly whipping the egg meats into a froth.

This invention was made to provide an improved means for this purpose, and while operating generally on conventional principles of centrifugal separation, it incorporates changes in the usual separator that improve its function whereby it can be used for the purpose of separating egg meats from their shells. The present invention may be run at a high rate of speed so that the egg shells are broken upon contact with the rotating basket of the centrifugal separator, and the egg meats are quickly separated from the shell particles. In using this invention, two machines operating in an alternate cycle can be made to handle any commercial run.

Basically this invention, which is an improvement on a basket-type centrifuge, includes the idea of sealing the egg meats off from air circulation during performance of the separation process and then provides a slow arrangement to handle the liquid egg meats with the least possible agitation. This is essential to eliminate the production of foam during performance of the separation process. This invention includes additional features which contribute to the more perfect separation of the white from the shell particles, as will appear more fully below.

Referring to the drawings where the preferred form of the invention is shown, the machine basically takes the form of a fixed casing 10, which is supported upon a closed pedestal 11. A rotating perforated basket 12 is supported in the casing 10, the basket being mounted upon a drive shaft 13, carried in suitable bearings supported from pedestal 11. In the base of pedestal 11 a pulley drive mounting for shaft 13 is provided which connects to the pulley driven by a motor 14. The drive mounting at the base of pedestal 11 is closed as closely as possible around the pulley drive means, or, if desired, the pulley and motor 14 can be completely enclosed to exclude all possibility of air entering into the casing 10. It has been found, however, that with a restricted throat in the pedestal 10, as shown, such sealing is not required.

The casing 10 is provided in its flow with a depressed flow channel 20, to receive the separated egg meats that flow down the inner wall of the casing. The egg meats which flow into the depressed channel 20 are carried around to an outlet passage 21, which slopes downwardly into a shell separating chamber 22, from where the egg meats flow through an outlet passage 23 into a reservoir or surge tank 24. The energy imparted to the egg meats by the rotating basket 12 causes the egg meats to flow around through the depressed flow passage 20 to the outlet 21, and from there they flow downwardly in the outlet passage. A baffle 25 is provided at the entrance to the outlet passage 21, on the downstream side, to prevent the egg meats from flowing backwardly in the depressed channel 20 into the outlet. Baffle 25 prevents the egg meats from flowing into the outlet passage in a manner to entrain air therewith.

The outlet passage 21 which delivers the egg meats into the reservoir 24 passes downwardly into the shell settling chamber 22 so far that its lower end is continuously maintained below the surface of the liquid egg meats held in the reservoir 24. This arrangement prevents any air from flowing into the casing 10 through the outlet passage 21.

The upper end of the casing 10 is sealed by a removable cover 30, which is seated on the upper end of the side wall of the casing with a suitable gasket interposed to seal the cover in position. The cover 30 is provided on its underside with a pair of vertically depending rings 31 and 32, the ring 31 being positioned with respect to the gasket seal, joint 33, so as to prevent liquid slinging from the basket from being impinged against the inner surface of the sealed joint. The ring 32 is designed to catch egg shell particles which tend to ricochet from the rotating basket, and prevents such shell particles from falling into the casing 10, where they would be carried over without separating egg meats into the reservoir 24. Ring 32 extends vertically downward from the cover 30 to a point just above the top 15 of basket 12. Top 15 of basket 12 is provided with a centrally-located opening 16 slightly smaller in diameter than that of ring 32. This opening 16 is of such a size that despite the tilting of basket 12 on its flexible mounting as it rotates under the action of motor 14, no binding or contact occurs between the edges of the opening and the egg-feeding means 34 hereinafter referred to. This opening, however, permits egg shell particles to ricochet up and out of basket 12 and it is to prevent such particles from falling on top of the closed portion of the top 15 of basket 12 and being hurled to the sides of the casing where they would mingle with and contaminate the separated liquid egg material that the ring structure 32 is provided. Ricocheting egg shell particles engage the inner sides of ring 32 and are thereby deflected downwardly and back into basket 12. The center of the cover 30 is provided with a funnel 34, which feeds the eggs to be treated directly into the basket 12. The funnel 34 is designed to be as small as possible, consistent with the rapid flow of bulk quantity of eggs into the basket.

In operation, eggs coming from the candling, sterilizing and stabilizing means are fed through the funnel 34 into the rapidly rotating basket 12. As the eggs fall into the basket, they are immediately broken, and the shell and egg meat phases flow to the periphery of the basket 12. The shell particles and most of the chalazas are retained on the inner wall of the basket while the egg meats flow through the periphery against the smooth inside wall of the casing 10. The separated egg meats flow down the wall 10 into the flow passage 20 and carry around to the outlet 21. The meats then flow downhill through the passage 21 into the reservoir 24.

The machine is operated until the basket 12 is filled with egg shells to such an extent that it becomes unbalanced. When this happens an excessive vibration is set up in the rotating basket and the centrifuge operation must be discontinued. When two machines are set up for side-by-side operation, one machine may be operated while the other machine is being emptied. In this manner a continuous flow of egg material can be run through the machines for separation.

It is to be noted that by reason of the smooth internal wall structure of casing 10 and because of the substantial sealout of air, the egg meats are separated from the shell particles with the least possible agitative effect. When this is done, the production of foam is minimized and a practicable separation of egg meats from shell particles can be had. The substantial sealing off of air flow from the centrifuge while separating the egg meats from the shell particles is essential, and further, the separation of the egg meats from the shells and from the centrifuge with the least possible agitative flow is important. For this reason the liquid sealing of the outlet passage 21, the substantial sealing of the casing 10 against admission of air, the smooth internal wall structure of the casing 10, the use of deflector ring 31, and the depression of the flow channel 20, all contribute to the successful separation of the egg meats from the shells in a centrifugal machine in a manner which has heretofore not been possible.

The above description is of the preferred form of this invention. It is obvious that many modifications thereof may be made which will fall within the scope of the following claims.

I claim:

1. A centrifugal separator for eggs comprising a substantially closed casing; a rotating perforated basket mounted within the casing; means to drive the basket so rapidly as to break the shells of eggs dropped into the basket, and effect rapid centrifugal separation of meats from shells; said casing having a smooth inside wall structure; a depressed flow channel extending annularly about the base of said casing and forming an integral part thereof; and an outlet connected to the flow channel of said casing, said outlet being of a size to quickly empty the separated meats from the casing.

2. A centrifugal separator for eggs comprising a substantially closed casing; a rotating perforated basket mounted within the casing; means to drive the basket so rapidly as to break the shells of eggs dropping into the basket, and to effect rapid centrifugal separation of meats from the shells; said casing having a smooth inside wall structure; a depressed flow channel extending annularly about the base of said casing adjacent the inner periphery thereof and forming an integral part of said casing; an outlet connected to the flow channel of the casing; said outlet forming a closed passage sloping downwardly from the flow channel in a manner whereby the separated egg meats may quickly flow from the casing with a minimum agitation; and a baffle in the flow channel around the periphery of said casing to prevent egg meats flowing backwardly into the outlet against the normal flow of egg meats produced by the energy imparted to the meats by the rotation of the basket.

3. A centrifugal separator for eggs comprising a substantially closed casing; a rotating perforated basket mounted within the casing; means to drive the basket so rapidly as to break the shells of eggs dropped into the basket, and effect rapid centrifugal separation of meats from shells; said casing having a smooth inside wall structure; a depressed flow channel extending annularly about the inner periphery of said casing below the level of the floor thereof and forming an integral part of said casing; an outlet connected to the flow channel of said casing, said outlet being of a size to quickly empty the separated meats from the casing; and a liquid-egg meat reservoir associated with the lower end of said outlet and forming therewith a liquid seal for said outlet.

4. A centrifugal separator for eggs comprising a casing; a close-fitting cover engaging the upper periphery of said casing and forming a seal therebetween; egg-introducing means located centrally of said cover and providing communication between the interior and exterior of said casing; a rotating perforated basket mounted within the casing; means to drive the basket so rapidly as to break the shells of eggs dropping into the basket, and to effect rapid centrifugal separation of meats from the shells; a cylindrical ring depending from the cover at a position disposed radially inward of and separate from the periphery of said casing; said casing having a smooth inside wall structure; a depressed flow channel extending annularly about the base of said casing and forming an integral part thereof; an outlet connected to the flow channel of the casing; said outlet forming a closed passage sloping downwardly from the flow channel in a manner whereby the separated egg meats may quickly flow from the casing with a minimum agitation; and a baffle in the flow channel around the periphery of said casing to prevent egg meats flowing backwardly into the outlet against the normal flow of egg meats produced by the energy imparted to the meats by the rotation of the basket.

5. A centrifugal separator for eggs comprising a casing; a close-fitting cover engaging the upper periphery of said casing and forming a seal therebetween; a rotating perforated basket mounted within the casing; means to drive the basket so rapidly as to break the shells of eggs dropping into the basket, and to effect rapid centrifugal separation of egg meats from the shells; a cylindrical ring depending from the cover at a position disposed radially inward of and separate from said casing in a manner to prevent the egg meats flowing from the basket from impinging against the seal between the cover and the casing; said casing having a smooth inside wall structure; a depressed flow channel extending annularly about the base of said casing adjacent the sides thereof and forming an integral part of said casing to receive the separated egg meats and protect them against agitation; an outlet connected to the flow channel of the casing; said outlet forming a closed passage sloping downwardly from the flow channel in a manner whereby the separated egg meats may quickly flow from the casing with a minimum agitation; a baffle in said flow channel around the periphery of said casing to prevent egg meats flowing backwardly into the outlet against the normal flow of egg meats produced by the energy imparted to the meats by the rotation of the basket; and a liquid egg reservoir associated with the lower end of said outlet and forming a liquid seal therefor.

6. A centrifugal separator for eggs comprising a casing; a close-fitting cover adapted to engage the upper periphery of said casing and to substantially form a seal therebetween; egg-introducing means located centrally of said cover and providing communication between the interior and exterior of said casing; a rotating perforated basket mounted within the casing; means to drive the basket so rapidly as to break the shells of eggs dropping into the basket and to effect rapid centrifugal separation of egg meats from the shells; a cylindrical ring depending vertically downward from the cover in a manner to prevent the egg meats flowing from the basket from impinging against the seal between the cover and the casing; said ring being disposed radially inward of and separate from the periphery of said casing; a second ring depending vertically downward from the cover and disposed radially inward of said first-mentioned ring; said second ring extending downwardly to a point just above the top of the rotating basket and forming an annular guard about the egg-introducing means; said casing having a smooth inside wall structure; and an outlet connected to said casing; said outlet being of a size to quickly empty the separated meats from the casing.

7. In a centrifugal separator for eggs wherein a rotating perforated basket is mounted within a substantially closed casing, the subcombination of a cover for said casing adapted to engage and form a substantially airtight seal with the upper periphery of said casing; egg-introducing means located centrally of said cover and providing communication between the interior and exterior of said casing; and a pair of rings affixed to and extending vertically downward from the under side of said cover; one of said rings being disposed near to but separate from the periphery of said casing in a manner to prevent liquid egg material flowing from the basket from impinging against the seal between the cover and the casing; and the other of said rings disposed radially inward of said first-mentioned ring, forming an annular guard about said egg-introducing means, and extending downwardly to a point just above the top of said basket.

WILLIAM J. PATTERSON.

REFERENCES CITED

The following references are of record in the file of this patent:

UNITED STATES PATENTS

| Number | Name | Date |
|---|---|---|
| 498,488 | Power | May 30, 1893 |
| 504,535 | McClure | Sept. 5, 1893 |
| 1,170,554 | Morath | Feb. 8, 1916 |
| 1,565,661 | Lomax | Dec. 15, 1925 |
| 1,689,152 | Parker | Oct. 23, 1928 |
| 2,089,215 | Lomax | Aug. 10, 1937 |
| 2,206,204 | Richli | July 2, 1940 |
| 2,314,206 | Grau | Mar. 16, 1943 |
| 2,354,096 | Archer | July 18, 1944 |